United States Patent [19]

Ikegame et al.

[11] Patent Number: 5,208,703
[45] Date of Patent: May 4, 1993

[54] APPARATUS FOR SUPPORTING OPTICAL SYSTEM

[75] Inventors: Tetsuo Ikegame; Ichiro Ikari, both of Hachioji, Japan

[73] Assignee: Olympus Optical Co., Ltd., Tokyo, Japan

[21] Appl. No.: 564,095

[22] Filed: Aug. 8, 1990

[30] Foreign Application Priority Data

Aug. 15, 1989 [JP] Japan ................. 1-209631

[51] Int. Cl.$^5$ ................. G02B 7/02; G11B 7/00
[52] U.S. Cl. ................. 359/813; 359/824; 369/44.15
[58] Field of Search ............... 350/247, 252, 255, 257; 369/44.15–44.18; 267/158–163

[56] References Cited

U.S. PATENT DOCUMENTS

| 345,767 | 7/1886 | Buckley | 267/163 |
|---|---|---|---|
| 4,653,856 | 3/1987 | Kamiko | 350/247 |
| 4,911,534 | 3/1990 | Henegouwen et al. | 350/255 |
| 4,927,235 | 5/1990 | Narumi | 350/252 |

FOREIGN PATENT DOCUMENTS

| 410715 | 1/1991 | European Pat. Off. | 350/247 |
|---|---|---|---|
| 64649 | 4/1983 | Japan | 369/44.16 |
| 61-55214 | 4/1986 | Japan . | |
| 61-220141 | 9/1986 | Japan | 369/44.15 |
| 62-31040 | 2/1987 | Japan | 369/44.15 |
| 62-54838 | 3/1987 | Japan | 369/44.15 |
| 62-57930 | 4/1987 | Japan . | |
| 62-125544 | 6/1987 | Japan . | |
| 63-62924 | 4/1988 | Japan . | |
| 63-195834 | 8/1988 | Japan . | |

Primary Examiner—Bruce Y. Arnold
Assistant Examiner—Thong Nguyen
Attorney, Agent, or Firm—Stevens, Davis, Miller & Mosher

[57] ABSTRACT

An apparatus for supporting an objective lens of an optical head including a lens holder for holding the objective lens, a movable member for supporting the lens holder, and a supporting member for supporting the movable member movably in focusing and tracking directions. The supporting member includes four leaf springs and each of the leaf springs has a main beam portion, first and second end portions for securing the supporting member to the movable member and a stationary member and a flexure portion which is provided in the vicinity of the second end portion and includes a beam element which is aligned with the main beam portion, two first projecting elements which extend from the beam element in a direction perpendicular to a longitudinal direction of the main beam portion on respective sides of the beam element and two second projecting elements which extend in parallel with the beam element from the second end portion. The supporting member further includes a damping member applied on the main beam portion and flexure portion such that spaces formed between the first and second projecting elements and the beam element are completely filled with resilient material of the damping member.

11 Claims, 8 Drawing Sheets

FIG_1
PRIOR ART

FIG_2
PRIOR ART

FIG_4
PRIOR ART

FIG_5A
PRIOR ART

FIG_5B
PRIOR ART

FIG_5C
PRIOR ART

FIG_5D
PRIOR ART

FIG_6

FIG_9

FIG_10A

FIG_10B

FIG_10C

FIG_11

APPARATUS FOR SUPPORTING OPTICAL SYSTEM

BACKGROUND OF THE INVENTION

1. Field of the Invention and Related Art Statement

The present invention relates to an apparatus for supporting an optical system, and more particularly relates to an apparatus for supporting an objective lens of an optical head movably in a focusing direction parallel to an optical axis of the objective lens as well as in a tracking direction perpendicular to the optical axis to effect focusing control and tracking control in an apparatus for writing information on an optical record disk and/or reading information out of the optical record disk.

There have been proposed various optical heads comprising an objective lens for projecting a light spot on an optical record disk, a supporting mechanism for supporting the objective lens movably in focusing and tracking directions, and a driving device for moving the objective lens in said focusing and tracking directions.

Figure 1:
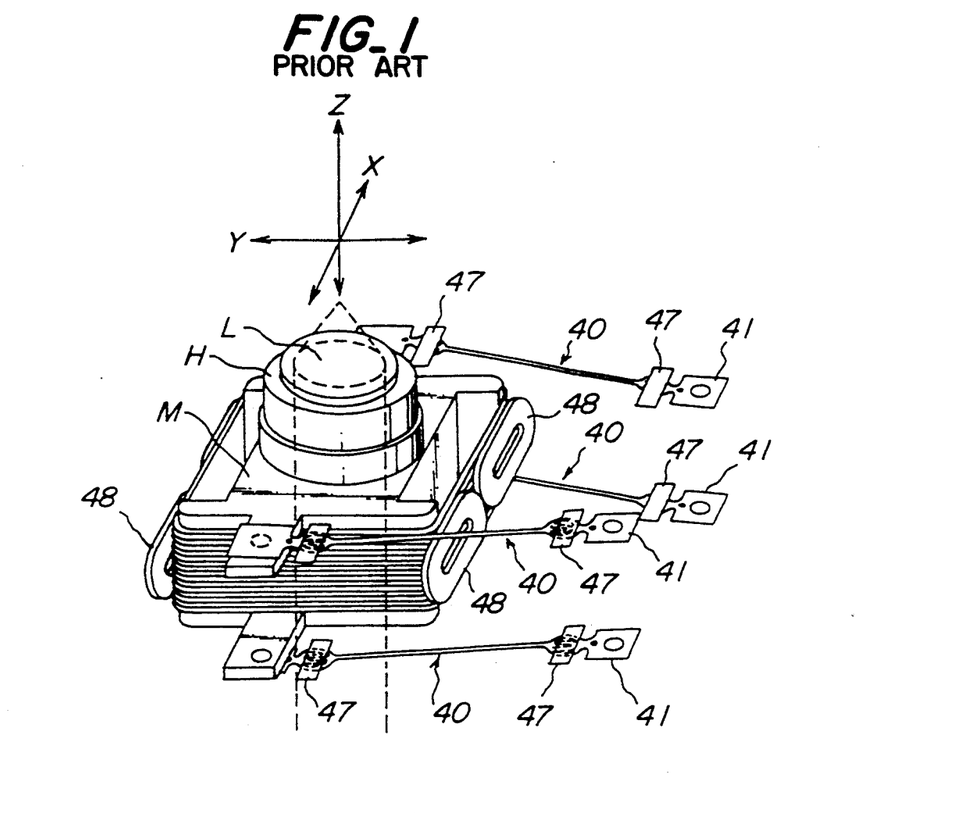
FIG. 1 is a perspective view showing an example of the known objective lens supporting apparatus.
Figure 2:
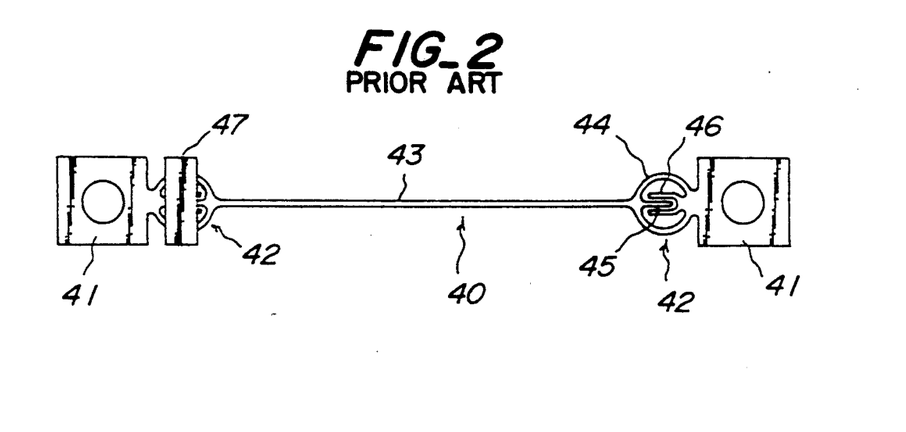
FIG. 2 is a plan view illustrating the construction of the resilient supporting member of the apparatus shown in FIG. 1.

For instance, Japanese Patent Application Laid-open Publication Kokai Sho 63-195834 discloses a known optical head. FIG. 1 is a perspective view showing this known optical head. An objective lens L is secured to a lens holder H and the lens holder is fixed to a movable member M. The movable member M is movably supported by four resilient wire-like supporting members 40. The construction of these supporting wires 40 is the same, so that the construction of only one supporting member will be explained. As illustrated in FIG. 2, the supporting member 40 comprises two end portions 41, a rectilinear connecting portion 43 for connecting the end portions to each other and flexure portions 42 provided near the end portions 41. The supporting member 40 is formed by etching a metal plate such as a copper plate and a stainless steel plate. To the flexure portions 42 are secured vibration suppressing members 47, respectively. The vibration suppressing member 47 may be formed by a rubber sheet. In FIG. 2 a right hand vibration suppressing member is omitted in order to show the construction of the flexure portion 42 clearly. The flexure portion 42 comprises a ring-shaped element 44, a substantially U-shaped element 46 provided at the center of the ring-shaped element and a straight element 45 which extends within a space of the U-shaped element. It should be noted that the U-shaped element 46 and straight element 45 are connected to each other only by means of the ring-shaped element 44.

Figure 3A:
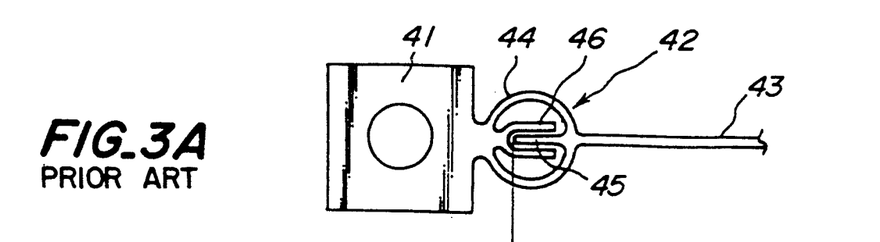
FIGS. 3A to 3D are plan views depicting various deformations of the supporting member of FIG. 2.
Figure 3B:
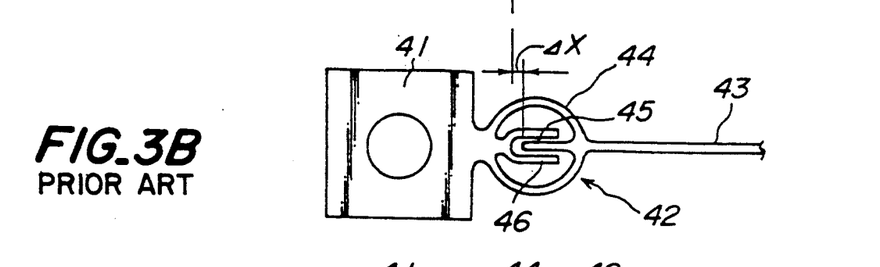

When the supporting member 40 is stretched in its longitudinal direction, the supporting member is deformed from the condition shown in FIG. 3A into the condition illustrated in FIG. 3B. That is to say, the ring-shaped element 44 is resiliently deformed into an elliptical shape and the straight element 46 is shifted in the longitudinal direction by a distance $\Delta x$. The U-shaped element 46 is not deformed.

Figure 3C:
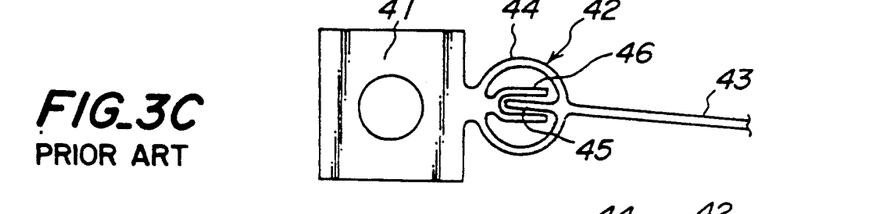

When the objective lens L is moved in the tracking direction X, the supporting member 40 is rotated in a plane parallel to the plane of the drawing of FIG. 3C. Then, a lower half portion of the ring-shaped element 44 is compressed and an upper half portion of the ring-shaped element is stretched, and the straight element 45 is tilted within the U-shaped element 46.

Figure 3D:
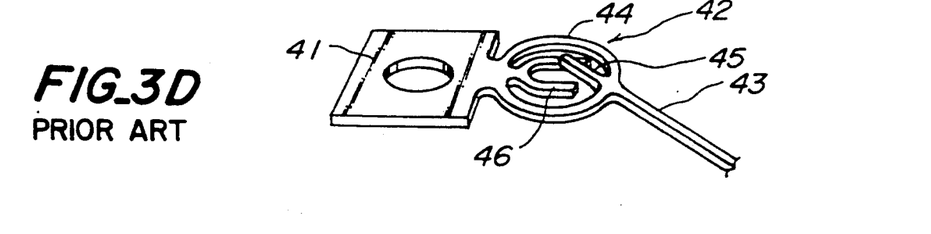

When the objective lens L is moved in the focusing direction Z, the supporting member 40 is deformed as depicted in FIG. 3D. That is to say, the straight element 45 is protruded from the plane of the U-shaped element 46.

As explained above, in the known supporting member, when the objective lens L is moved, the flexure portion 42 is deformed in accordance with the direction of the movement of the objective lens. Since the vibration suppressing member 47 is secured to the flexure portion 42, vibrations in all directions are suppressed.

In general, in the optical system supporting apparatus, a center point to which a driving force is applied should be made coincident with a center of gravity of the movable member M. If these two centers are not coincident with each other, there is produced a moment about the center of gravity of the movable member M and the movable member might be rotated. Then the objective lens L might be tilted and its optical property might be deteriorated. Further the position of the objective lens L might be shifted and the information could not be read or written correctly.

In the known objective lens supporting apparatus shown in FIG. 1, when the movable member M is driven in the tracking direction X, the movable member is twisted about the Y axis to generate a rolling resonance due to the deviation of the center of gravity of the movable member with respect to the center of the driving force. This deviation in the center points is generally produced by positional errors of the moving coils, yokes and magnets and uneven distribution of magnetic flux density within magnetic gaps. The rolling movement is also produced by forces generated in the Z direction (focusing direction) at portions of tracking coils 48 which extend in the X direction (tracking direction). In order to suppress the rolling resonance produced by such 2-direction forces, it is necessary to suppress the twisting motion of the movable member M about the Y axis (track direction).

However, in the known objective lens supporting apparatus shown in FIGS. 1 to 3, there is not provided any means for suppressing the rolling resonance. When the supporting member 40 is subjected to the twisting force about the Y axis, the connecting portion 43 is liable to be twisted, because the size of the flexure portion 42 in the X axis direction is wider than the connecting portion 43 and the connecting portion 43 is not covered with the damping member 47 and thus the flexure portion is hardly twisted as compared with the connecting portion. It is true that the straight element 45 is rotated about the Y axis, but its rotational amount is small. Therefore, when the supporting member 40 is subjected to the twisting moment about the Y axis, the connecting portion 43 is twisted, but the flexure portion 42 and particularly the straight element 45 are hardly twisted. In other words, the damping member 47 does not effectively serve to suppress the twisting motion of the supporting member 40.

Figure 4:
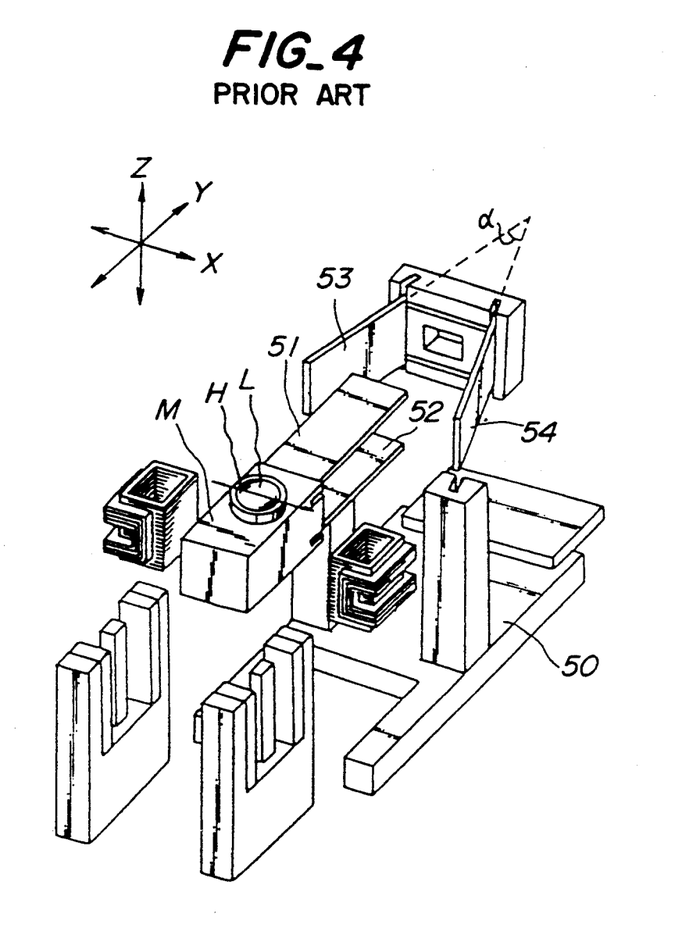
FIG. 4 is a perspective view showing another example of the known objective lens supporting apparatus.
Figure 5A:
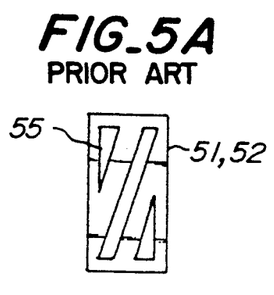
FIGS. 5A to 5D illustrate variety of the cut out portions formed in the reliant supporting member of the apparatus shown in FIG. 4.
Figure 5B:
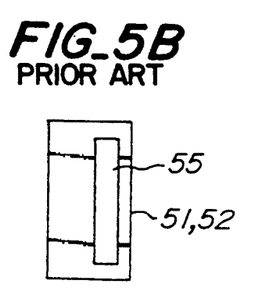
Figure 5C:
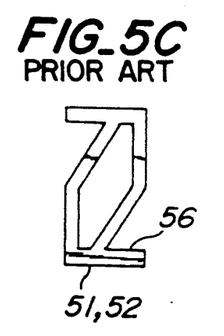
Figure 5D:
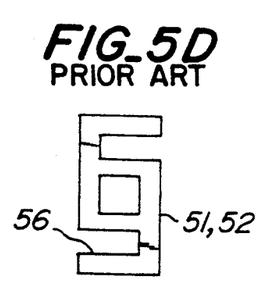

In order to suppress the twisting movement much more effectively, there has been proposed another known objective lens supporting apparatus which is described in Japanese Patent Application Laid-open Publication Kokai Sho 62-125544. This known apparatus is shown in FIG. 4. The objective lens L is held by a lens holder H and the lens holder is secured to a movable member M. The movable member M is connected to an intermediate member 49 by means of a first pair of leaf springs 51 and 52 movably in the focusing direction Z. The intermediate member 49 is further connected to posts of a base 50 by means of a second pair of leaf springs 53 and 54, so that the movable member M is movable in the tracking direction X. The first pair of leaf springs 51 and 52 are arranged in parallel with each other, but the second pair of leaf springs 53 and 54 are arranged to form an angle α therebetween. In this known apparatus, in order to suppress the twisting motion of the movable member M, the first pair of leaf springs 51, 52 have formed therein cut out portions 55 and 56 as illustrated in FIGS. 5A to 5D.

In the known apparatus shown in FIG. 4, the twisting movement can be suppressed by means of the leaf springs 51, 52 having the cut out portions 55 and 56 which are formed asymmetrically, but other undesired vibrations in the focus direction Z could not be removed. Moreover, when the supporting member is formed by a thin wire or strip, it is practically impossible to form the cut out portion therein.

In Japanese Utility Model Application Laid-open Publication Kokai Sho 61-55214, there is disclosed still another known objective lens supporting apparatus in which the resilient supporting member is connected to the movable member holding the objective lens and to the stationary member by means of cementing agent having the elasticity. In this known apparatus the positions at which the resilient supporting member is fixed to the movable member and to the stationary member are liable to be shifted and the optical axis of the objective lens is liable to be tilted when a large external vibration is applied or the movable member is shifted to a large extent, and the stable servo control could not be effected.

In Japanese Patent Application Laid-open Publication Kokai Sho 62-57930, there is described still another known objective lens supporting apparatus in which the objective lens supporting member includes a leaf spring, at least one lug-like element which is formed in the leaf spring by cutting and bending a portion of the leaf spring and a damping sheet which is applied on the leaf spring. This known supporting member has a drawback that the leaf spring can not be twisted easily about a longitudinal direction. Moreover, the width of the leaf spring is liable to be large.

In Japanese Patent Application Publication Kokai Sho 63-62924, there is described also a known optical head in which the objective lens is supported movably in the focusing and tracking directions. In this known optical head, a rigid rod-like member is provided, one end of which is secured to the objective lens supporting member and the other end of which is connected to the stationary member by means of a damping member such as a rubber block. In this known optical head, the rod-like member suppresses the movement of the objective lens, so that the objective lens is liable to be tilted. Further the rod-like member might produce undesired resonance. Moreover the rod-like member has a substantial weight, and thus the weight of the overall objective lens assembly becomes large.

SUMMARY OF THE INVENTION

The present invention has for its object to provide a novel and useful apparatus for supporting an optical system movably, in which the vibration in a desired direction as well as the twisting movement can be suppressed effectively, while the undesired tilting movement of the optical axis of the optical system can be avoided.

It is another object of the invention to provide an optical system supporting apparatus in which the weight of the moving portion can be reduced and the sensitivity of the movement can be increased.

According to the invention, an apparatus for supporting an optical system movably in at least one direction comprises:
  a holding member for holding the optical system; and
  a supporting means made of resilient material and having a main beam portion which extends in a first direction, a first end portion provided at one end of said main beam portion for connecting the main beam portion to the holding means, a second end portion provided at the other end of said main beam portion for connecting said main beam portion to a stationary member, and at least one flexure portion formed in the vicinity of at least one of said first and second end portions and including at least one first projecting element which extends from said main beam portion perpendicularly to said first direction, at least one projecting portion which extends from said main beam portion and a second projecting element extending from said projecting portion in said first direction such that the second projecting element is separated from said main beam portion and first projecting element; and
  a damping member provided on at least said flexure portion such that the first and second projecting elements, projecting portion and main beam portion are connected to each other by means of said damping member.

In the optical system supporting apparatus according to the present invention, the flexure portion includes the first and second projecting elements which extend perpendicularly to the longitudinal direction of the resilient supporting means and in parallel therewith, respectively, and the damping member is provided such that the first and second projecting elements and beam element are connected to each other via the damping member. In a preferred embodiment of the invention, the damping member is provided in such a manner that spaces between the first and second projecting elements as well as spaces between these projecting elements and the main beam portion are filled with damping material. This construction of the supporting means according to the invention can be easily realized by providing the damping member with the aid of a mold.

DETAILED EXPLANATION OF THE PREFERRED EMBODIMENTS

Figure 6:
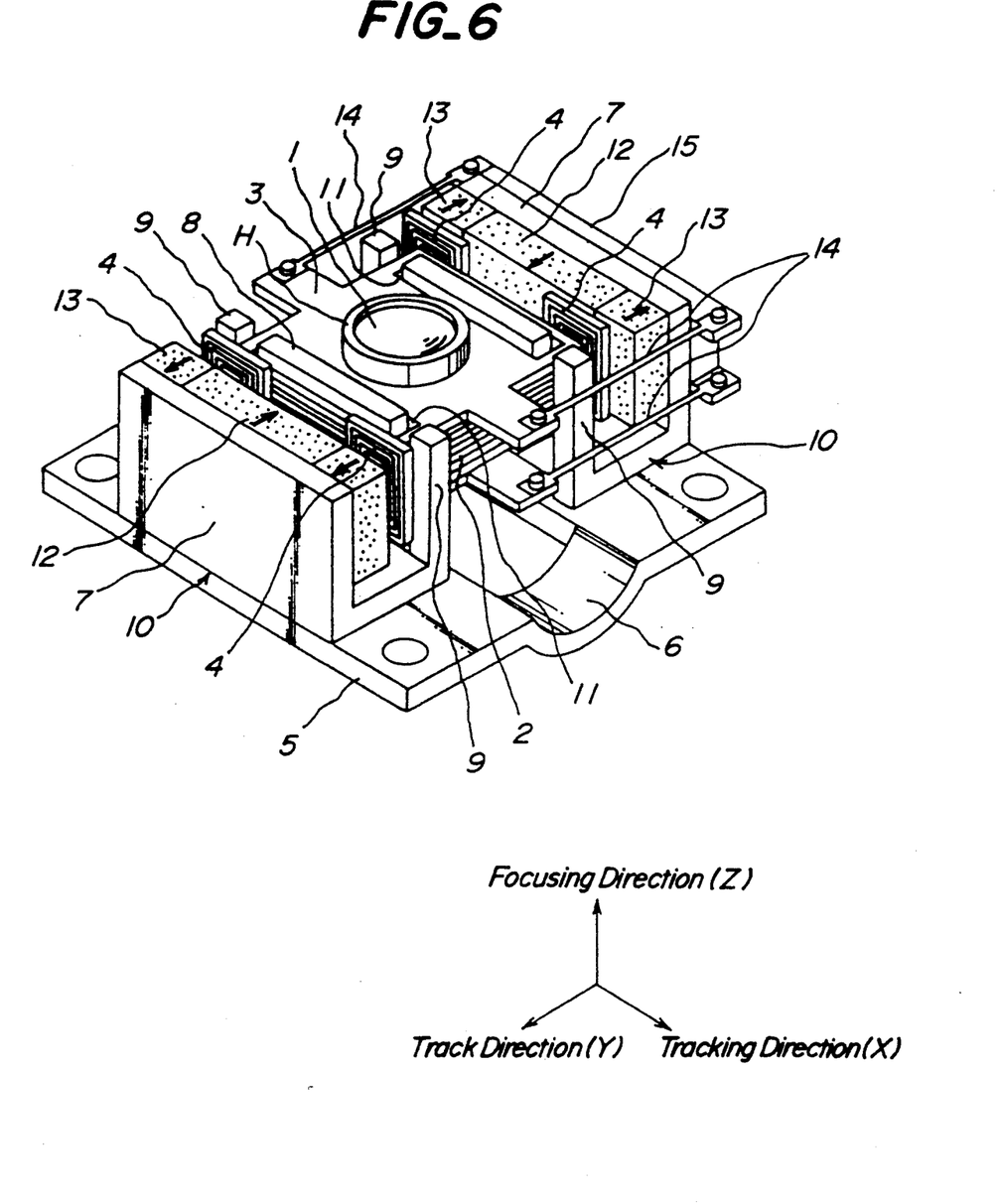
FIG. 6 is a perspective view showing an embodiment of the optical system supporting apparatus according to the invention.

FIG. 6 is a perspective view showing an embodiment of the apparatus for supporting an objective lens movably in the focusing and tracking directions. An objective lens 1 is held by a lens holder H which is then secured to a movable member 3 on which a focusing coil 2 is wound. Further four flat-shaped tracking coils 4 are secured to the movable member 3 at its four corners. In a base 5 which is formed by pressing an aluminum plate, there is formed a depression 6 constituting an optical path, and a pair of yokes 10 folded substantially in a U-shaped form are secured on the base 5 such that these yokes are opposed to each other with respect to the depression 6. The yoke 10 includes three upright portions 7, 8 and 9. In the movable member 3 there are formed rectangular recesses 11 and the upright portions 8 of the yokes are inserted into these recesses, respectively. Within spaces substantially surrounded by the upright portions 7 and 8 there are arranged permanent magnets 12 which are secured to the upright portions 7. Further within spaces surrounded by the upright portions 7 and 9 there are also arranged permanent magnets 13 which are also secured to the upright portions 7. It should be noted that the magnetizing direction of the permanent magnets 12 and 13 are opposite to each other as shown by arrows.

The movable member 3 is supported by four resilient members, i.e. leaf springs 14. One end of the leaf springs 14 is secured to the movable member 3 and the other end is fixed to a fixing member 15 which is secured to the outer surface of the upright portion 7 of the right hand yoke 10. In this manner, the movable member 3 can be supported movably in the focusing direction Z as well as in the tracking direction X.

Figure 7:
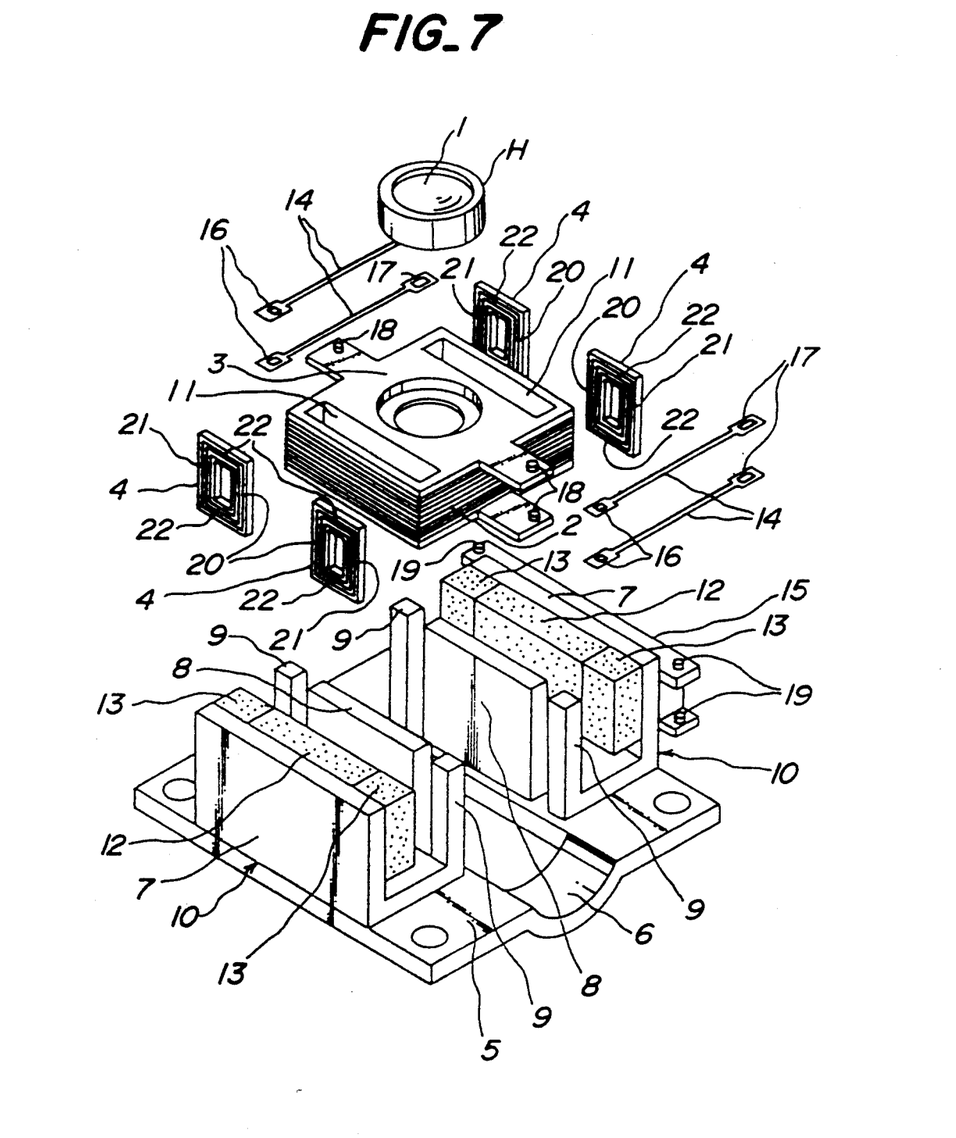
FIG. 7 is an exploded perspective view of the apparatus shown in FIG. 6.

FIG. 7 is an exploded perspective view showing the construction of the apparatus shown in FIG. 6. As shown in FIG. 7 in one end of the leaf spring 14 there is formed a square opening 16 and in the other end thereof there is formed a rectangular opening 17. In the movable member 3 there are formed projections 18 and in the fixing member 15 there are provided projections 19. By inserting these projections 18 and 19 into the openings 16 and 17, respectively, the leaf springs 14 can be positioned simply and accurately without utilizing a special positioning tool.

Figure 8:
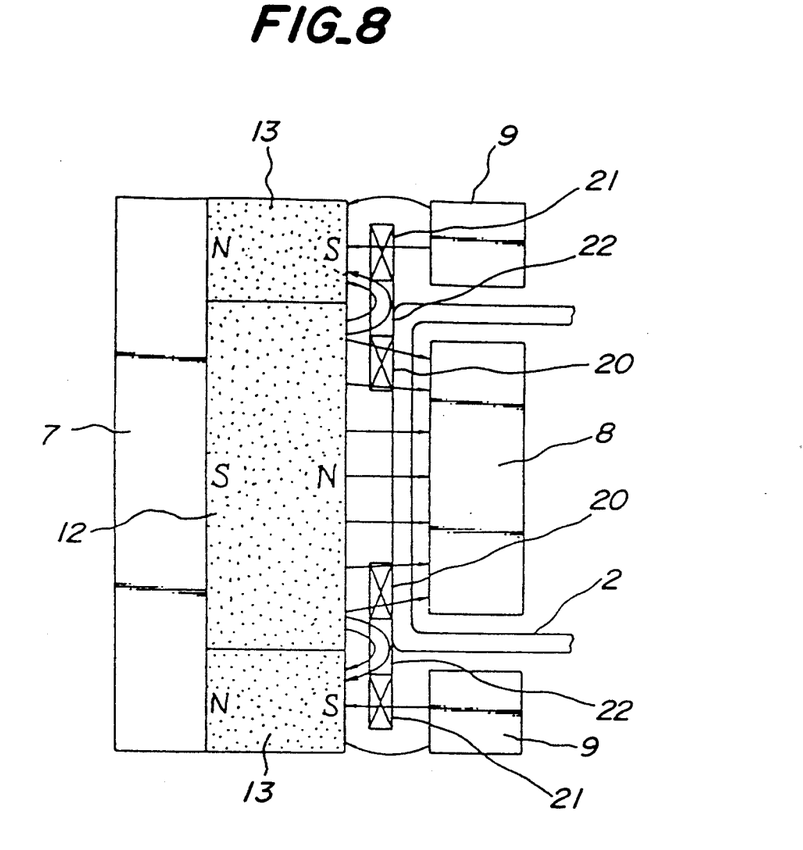
FIG. 8 is a plan view showing the magnetic flux applied to coils.

FIG. 8 is a plan view showing the magnetic flux applied to the tracking coils 4 and focusing coil 2. The magnetic flux generated by the permanent magnet 12 passes through inner vertical sides 20 of the tracking coils 4 and the magnetic flux generated by the permanent magnets 13 passes through outer vertical sides 21 of the tracking coils. Further the magnetic flux generated by the permanent magnet 12 passes through one side of the focusing coil 2. Therefore, by supplying a focus error correcting current to the focusing coil 2, the focusing coil is subjected to forces which move the focusing coil and thus the movable member 3 in the focusing direction Z. Similarly by supplying a tracking error correcting current to the tracking coils 4, the tracking coils are subjected to forces which drive the tracking coils and thus the movable member 3 in the tracking direction X. In the present embodiment, the flat tracking coils 4 are secured to the movable member 3, so that the dimension of the driving mechanism can be reduced in the track direction Y as well as in the tracking direction X. Further the yokes 10 can be provided on the base 5 having the U-shaped depression 6, so that the overall construction of the magnetic circuit can be simplified and the number of constructional elements can be reduced. Therefore, the magnetic circuit can be assembled simply and the cost of the apparatus can be reduced.

Figure 9:
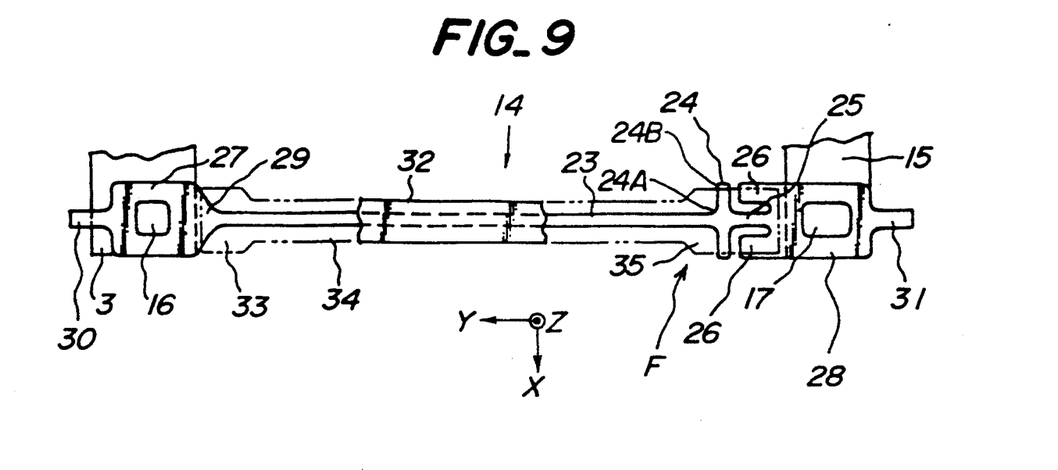
FIG. 9 is a plan view illustrating the detailed construction of the leaf spring shown in FIG. 6.
Figure 10A:
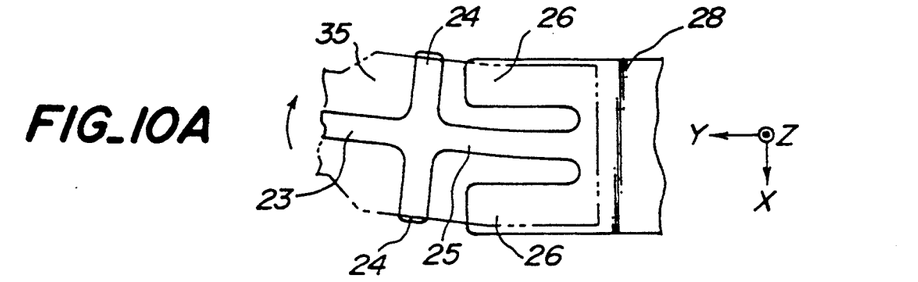
FIGS. 10A to 10C are plan views showing the deformations of the leaf spring.
Figure 10B:
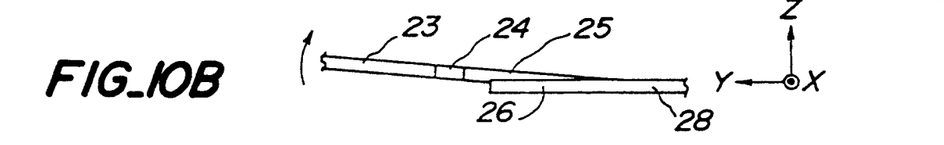
Figure 10C:
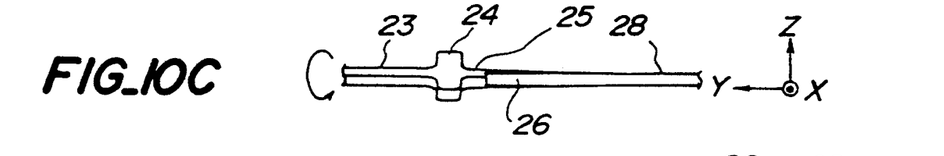

FIG. 9 is a plan view showing the construction of the resilient supporting member having the leaf spring 14 and FIGS. 10 A to 10C illustrate various deformations of the leaf spring. The leaf spring 14 may be formed by etching or pressing a plate having a thickness of 0.1 mm and made of a metal such as phosphor bronze, beryllium bronze and stainless steel. A main beam portion 23 of the leaf spring 14 is formed to have a very small width so that it is easily bent like a wire in all directions and at both ends of the leaf spring are formed first and second end portions 27 and 28 having a larger width than the main beam portion 23. As illustrated in FIG. 9 in the first and second end portions 27 and 28 there are formed the substantially square and rectangular openings 16 and 17, respectively. Further these end portions 27 and 28 include projections 30 and 31 to which electric wires for supplying the focusing and tracking error correcting currents to the focusing coil 2 and tracking coils 4 are connected. That is to say, the leaf springs 14 are made of an electrically conductive material and serve to conduct the electric currents. In the present embodiment, in the vicinity of the second end portion 28 there is formed a flexure portion F which includes first projecting elements 24 which extend from a beam element 25 in the direction perpendicular to a longitudinal direction of the leaf spring and second projecting elements 26 which extend from the second end portion 28 toward the first projecting elements 24 in the longitudinal direction of the leaf spring 14 in parallel with the beam element 25. As shown in FIG. 9, first projecting element 24 has a first end 24A which is connected to and extends from main beam portion 23 perpendicularly to direction Y in which main beam portion 23 extends and a second free end 24B. It should be noted that the beam element 25 is aligned with the main beam portion 23, and the first and second projecting elements 24 and 26 and beam element 25 are formed such that a substantially L-shaped narrow space is formed therebetween. Between the first end portion 27 and the main beam portion 23 there is formed a tapered element 29.

The main beam portion 23, first and second projecting elements 24 and 26, beam element 25 and tapered element 29 are covered with a damping member 32 made of butyl rubber. As shown in FIG. 9, the width of a portion of the damping member 32 which surrounds the main beam portion 23 of the leaf spring 14 is made smaller than that of the remaining portion. In the present embodiment, the damping member 32 is provided by placing the leaf spring within a mold and then raw butyl rubber is introduced into the mold. Then the raw butyl rubber is cured in the mold. By using such a mold, narrow spaces between the first and second projecting elements 24 and 26 and the beam element 25 can be filled with the rubber.

FIGS. 10A to 10C represent the deformation of the flexure portion F of the resilient supporting member 14. FIG. 10A shows a condition in which the first end portion 27 is shifted in the X direction with respect to the second end portion 28. In this condition, the beam element 25 is deformed in the X direction. Since the first projecting elements 24 extend in the X direction as, tips of these elements are shifted over a longer distance viewed in the Y direction. That is to say, the distance between the tip of the upper first element 24 and the tip of the upper second projecting element 26 is shortened and the distance between the tip of the lower first projecting element 24 and the tip of the lower second projecting element 26 is widened. Therefore, upper and lower parts of a portion 35 of the damping member 32 which covers the flexure portion F are subjected to compressing and stretching deformations, respectively, so that the supporting member 3 can be effectively prevented from vibrating in the X direction. Further the vibration of the main beam portion 23 can be suppressed by the damping member 32. At the first end portion 27, the vibration energy of the main beam 23 can be effectively absorbed by the tapered element 29 and a part 33 of the damping member 32 which surrounds the tapered element.

FIG. 10B illustrates the situation in which the first end portion 27 is shifted in the Z direction with respect to the second end portion 28. In this case the main beam portion 23, projecting elements 24 and beam element 25 of the leaf spring 14 are displaced in the Z direction. Then, the portion 35 of the damping member 32 is subjected to the stretching movement and thus the vibration of the supporting member 3 in the focusing direction Z can be suppressed by means of portions 33 and 34 of the damping member 32 which are applied on the main beam portion 23 and tapered portion 29.

FIG. 10C shows the condition in which the first end portion 27 is twisted about the Y axis with respect to the second end portion 28. In this situation, portions of the damping member 32 which are disposed between the projecting portions 24 and 25 are subjected to the stretching deformation, so that these parts of the damping member effectively serve to suppress the twisting movement of the leaf spring 14.

When the movable member 3 is twisted about the center of gravity of the movable member, the first end portion 27 of the leaf spring 14 is subjected to all of the above mentioned displacements, i.e. the displacement in the Z direction, the displacement in the X direction and the twisting movement about the Y axis. In other words, in such a case the situations shown in FIGS. 10A to 10C appear simultaneously. Then the twisting movement of the movable member can be effectively prevented in the manner explained above.

Since the first projecting elements 24 extend in the direction perpendicular to the longitudinal direction of the leaf spring 14, the displacing motion of the main beam portion 23 and beam element 25 is amplified. Also the portion of the damping member 32 surrounding these portions is subjected to a large displacement, and thus the damping member can suppress the vibration effectively. Further the parts of the damping member 32 located between the projecting elements 24 and the projecting elements 26 can provide a large damping effect, because these parts of the damping member constitute a sandwich type damper viewed in the plane of the leaf spring.

In the present embodiment, the direction of the magnetic field which affects the portion 22 of the tracking coil 4 which extends in the X direction also extends in the X direction. As a result, the force generated in this portion 22 also extends substantially in parallel with the X direction and thus its amplitude is very small. Therefore, the twisting vibration due to this force is very small.

The present invention is not limited to the embodiment explained above, but many modifications and alternatives may be conceived by those skilled in the art within the scope of the invention. In the above embodiment, the flexure portion F including the first and second projecting elements 24 and 26 and beam element 25 is formed in the vicinity of only the second end portion 28, but the flexure portion may be equally provided in the vicinity of the first end portion 27 instead of the tapered portion 29. In this case, the damping effect may be further improved. Further it is not always necessary to provide the damping member such that the leaf spring is completely covered with the damping member, but the damping member may be applied only to one side of the leaf spring. Moreover when the damping member is formed by a sheet and the sheet is adhered to the leaf spring, the damping member might not be filled in the spaces between the projecting elements and the beam element of the leaf spring. According to the invention, the damping effect could be attained even in such a construction.

Figure 11:
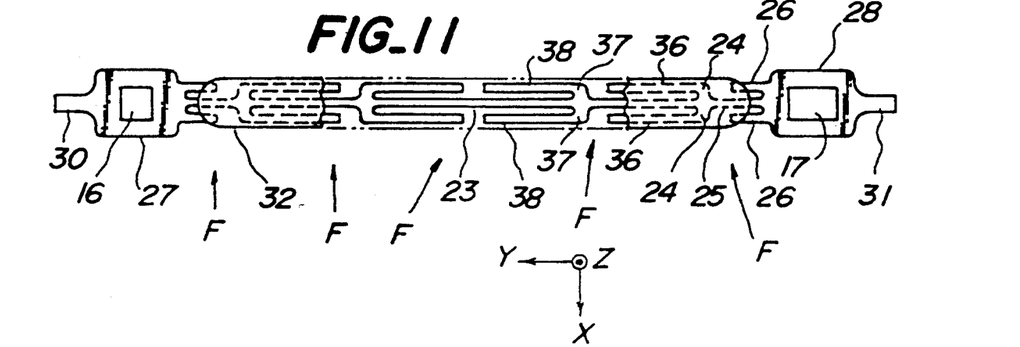
FIG. 11 is a plan view showing another embodiment of the resilient supporting member according to the invention.

FIG. 11 is a plan view showing another embodiment of the leaf spring according to the invention. In FIG. 11 portions similar to those shown in FIG. 9 are denoted by the same reference numerals used in FIG. 9. In the present embodiment, a plurality of flexure portions F are formed along the whole length of the main beam portion 23. The construction of the outermost flexure portions is substantially the same as that of the previous embodiment shown in FIG. 9. A center flexure portion comprises only second projecting elements 38 which extend from first projecting elements 37 of intermediate flexure portions. Second projecting elements 36 of the intermediate flexure portions extend from the first projecting elements 24 of the outermost flexure portions. There is further provided a damping member 32 which covers all the flexure portions F. Then parts of the damping member which are disposed between the second projecting elements 36 and 38 and the main beam portion 23 and between the opposing second projecting elements of the center flexure portion can serve to suppress the twisting vibration when the first end portion 27 is shifted in the X direction with respect to the second end portion 28. Similarly the damping effect can be equally attained for the displacement in the Z direction and the twisting movement about the Y axis.

In the present embodiment, since a plurality of flexure portions F are formed along the main portion 23, the damping action is enhanced much more effectively as compared with the previous embodiment.

It should be further noted that the supporting member may be made of plastics instead of the metal. Further the supporting member may be formed such that it supports the movable member movably only in one direction. Moreover, the optical element may be constituted by any optical element such as a laser diode instead of an objective lens. In the above mentioned embodiment of the optical system supporting member according to the invention, the four resilient supporting leaf springs are arranged in parallel with each other, but according to the invention two resilient supporting leaf springs may be arranged to form an acute angle therebetween a shown in FIG. 4.

As explained above in detail, according to the invention there are provided the first projecting elements which extend in the direction perpendicular to the longitudinal direction of the supporting member and the second projecting elements which extend in the longitudinal direction of the supporting member and the damping member is disposed in the space formed between these first and second projecting elements as well as the main beam portion. Therefore, vibrations in one or more given directions and the twisting movement of the supporting member can be effectively suppressed. Therefore, the tilting movement of the optical element which is supported by the supporting member can be prevented effectively and thus the optical element can be driven by means of the servo mechanism in a stable manner.

What is claimed is:

1. An apparatus for supporting an optical system movably in at least one direction comprising:
    a holding means for holding the optical system;
    a supporting means for said holding means, said supporting means being made of resilient material and having a main beam portion which extends in a first direction, a first end portion providied at one end of said main beam portion for connecting the main beam portion to the holding means, a second end portion provided at the other end of said main beam portion for connecting said main beam portion to a stationary member, and a first flexure portion formed in the vicinity of at least one of said first and second end portions and including at least one first projecting element which extends from said main beam portion perpendicularly to said first direction, at least one projecting portion which extends from said main beam portion and a second projecting element extending from said projecting portion in said first direction, the second projecting element being spaced apart from said main beam portion and said first projecting element; and
    a damping member provided on at least said flexure portion such that the first and second projecting elements, the projecting portion and the main beam portion are interconnected by means of said damping member.

2. An apparatus according to claim 1, wherein said damping member is provided to cover also the main beam portion of the supporting means.

3. An apparatus according to claim 2, wherein said damping member is formed by a molding of resilient material which fills spaces between the first and second projecting elements and main beam portion.

4. An apparatus according to claim 3, wherein said resilient material of the damping member is rubber material.

5. An apparatus according to claim 2, wherein said supporting means comprises a leaf spring in which said main beam portion, end portions and flexure portion are formed.

6. An apparatus according to claim 5, wherein said damping member comprises two sheets made of elastic material and applied on respective sides of the leaf spring.

7. An apparatus according to claim 5, wherein said damping member comprises a sheet made of elastic material and applied on one side of the leaf spring.

8. An apparatus according to claim 1, wherein said supporting means comprises a second flexure portion formed in the vicinity of the other one of said first and second end portions, respectively.

9. An apparatus according to claim 8, wherein said supporting means further comprises at least two flexure portions which are formed along the main beam portion between said first and second flexure portions.

10. An apparatus according to claim 1, wherein said flexure portion comprises two first projecting elements which extend from the main beam portion in opposite directions and two second projecting elements which extend on respective sides of the main beam portion in said first direction.

11. An apparatus according to claim 1, wherein said projecting portion is formed integrally with said end portion.

* * * * *